US012182153B2

(12) United States Patent
Palazzo et al.

(10) Patent No.: US 12,182,153 B2
(45) Date of Patent: Dec. 31, 2024

(54) DIGITAL FORENSICS TOOL AND METHOD

(71) Applicant: GRAYSHIFT, LLC, Atlanta, GA (US)

(72) Inventors: Robert Palazzo, Marietta, GA (US);
Kerry Armistead, Alpharetta, GA (US);
Andrea Dickerson, Duluth, GA (US);
Justin Fisher, Marietta, GA (US);
David Miles, Peachtree City, GA (US);
David Smalley, Macungie, PA (US);
Braden Thomas, Roswell, GA (US);
Philip Thrasher, Lawrenceville, GA (US)

(73) Assignee: MAGNET FORENSICS, LLC, Atlanta, GA (US)

(*) Notice: Subject to any disclaimer, the term of this patent is extended or adjusted under 35 U.S.C. 154(b) by 73 days.

(21) Appl. No.: 17/865,216

(22) Filed: Jul. 14, 2022

(65) Prior Publication Data

US 2023/0023798 A1    Jan. 26, 2023

Related U.S. Application Data

(60) Provisional application No. 63/222,361, filed on Jul. 15, 2021.

(51) Int. Cl.
*G06F 16/00* (2019.01)
*G06F 16/25* (2019.01)
*G06Q 50/26* (2012.01)

(52) U.S. Cl.
CPC ........ *G06F 16/254* (2019.01); *G06Q 50/265* (2013.01)

(58) Field of Classification Search
CPC .................................................. G06F 16/254
See application file for complete search history.

(56) References Cited

U.S. PATENT DOCUMENTS

| | | | |
|---|---|---|---|
| 11,216,900 B1 * | 1/2022 | Galyean | G06Q 50/26 |
| 2007/0271517 A1 | 11/2007 | Finkelman | |
| 2009/0216775 A1 * | 8/2009 | Ratliff | G06Q 10/08 |
| 2009/0288164 A1 | 11/2009 | Adelstein | |
| 2012/0166456 A1 | 6/2012 | Kim | |
| 2012/0209983 A1 | 8/2012 | Bronner | |
| 2012/0239666 A1 | 9/2012 | Morimoto | |
| 2012/0310895 A1 * | 12/2012 | Hoog | G06F 16/258 707/675 |
| 2014/0200929 A1 * | 7/2014 | Fitzgerald | H04W 12/126 705/4 |
| 2020/0218546 A1 * | 7/2020 | Aggarwal | G06F 9/4416 |
| 2021/0049264 A1 * | 2/2021 | Barrow | G06F 9/45558 |
| 2022/0019950 A1 * | 1/2022 | Sabri | G06Q 20/123 |
| 2022/0171765 A1 * | 6/2022 | Molina | G06Q 50/265 |

* cited by examiner

*Primary Examiner* — Syed H Hasan
(74) *Attorney, Agent, or Firm* — DLA PIPER LLP US

(57) ABSTRACT

A digital forensics tool and associated method are disclosed for extracting digital data from a user computing device, transforming and analyzing the digital data, and generating an interactive user interface that facilitates the identification of important digital data, such as for a criminal investigation.

40 Claims, 13 Drawing Sheets

FIGURE 4A

Screen 400

Device Information 401
- Evidence ID
- Examiner Name
- Device Name
- User Name
- OS Version
- Model
- UDID
- Serial Number
- ECID
- WiFi MAC
- Bluetooth MAC
- Phone Number
- IMEI
- Passcode
- Data Partition Size
- Lock State
- Agent Version
- Backup State
- Accounts Passcode Status 402

Input Interfaces 402

Interface 403 (Example: Obtain All Data)

Interface 404 (Example: Obtain Select Data)

Interface 405 (Example: Restart Agent)

Interface 406 (Example: Uninstall Agent)

FIGURE 6A

Screen 600

Latest Message 601

Most Contacted 602

Most Recent Location 603

Message Details 604

Device Owner 605
- Phone Number
- Email
- Snapchat ID
- Instagram ID
- Facebook ID
- Messenger ID Device Information 606
- Device Name
- Software Build
- Software Version
- Airdrop ID
- IMEI
- Serial Number
- Product Type Tagged Clues 607
- Photo
- Video
- Text
- Phone Call
- Email
- Social Media Post
- Location

FIGURE 6B

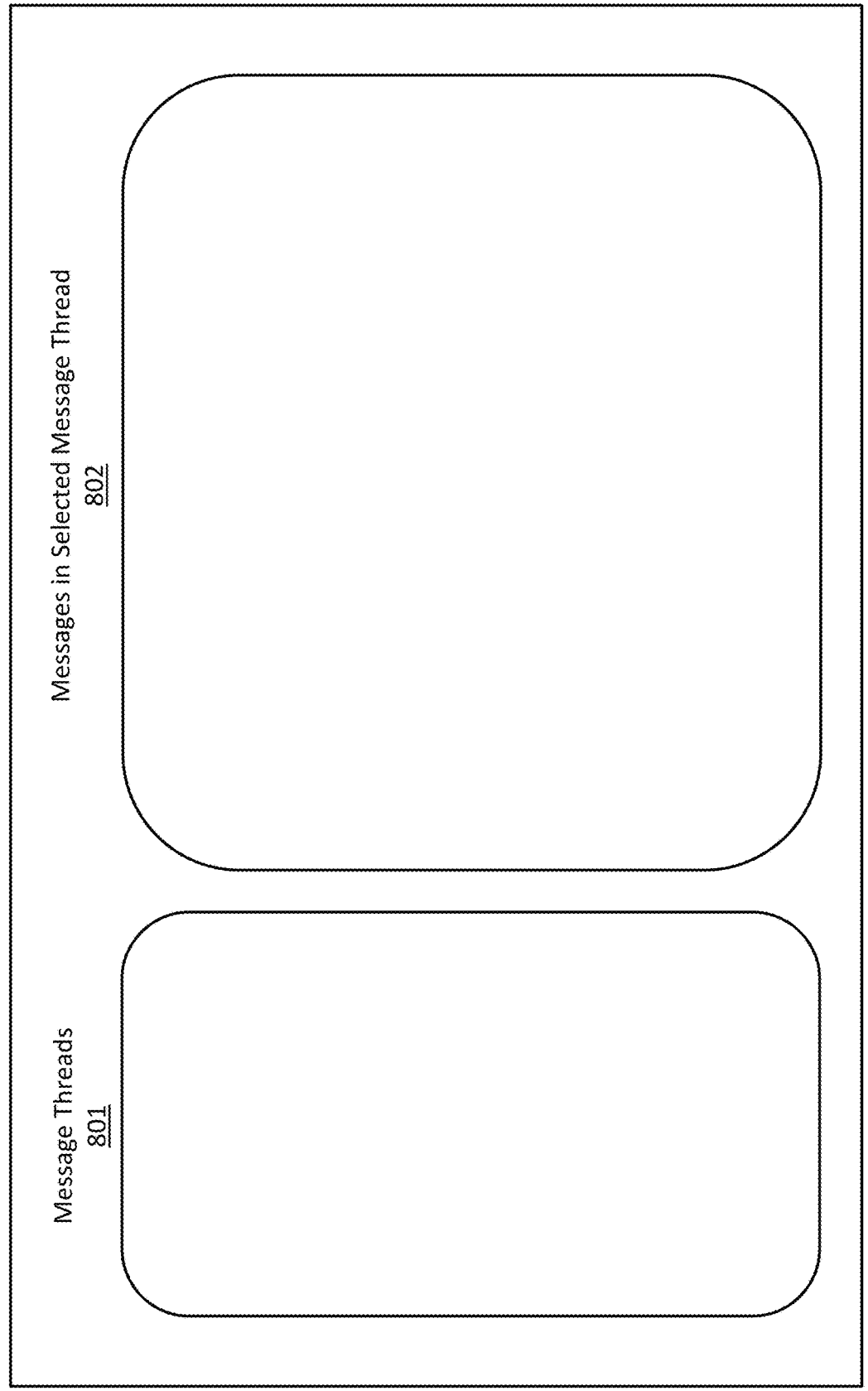

DIGITAL FORENSICS TOOL AND METHOD

PRIORITY CLAIM

This application claims priority to U.S. Provisional Patent Application No. 63/222,361, filed Jul. 15, 2021, and titled, "Digital Forensics Tool," which is incorporated by reference herein.

FIELD OF THE INVENTION

A digital forensics tool and method are disclosed for extracting digital data from a user computing device, transforming and analyzing the digital data, and generating an interactive user interface that facilitates the identification of important digital data, such as evidence for a criminal investigation.

BACKGROUND OF THE INVENTION

Digital forensic investigators regularly need to collect and identify important evidence among digital data of numerous computing devices, such as mobile devices belonging to suspects and witnesses. These computing devices involve multiple manufacturers, models, operating systems, and applications.

Investigators face several challenges in obtaining information from numerous computing devices including identifying digital data that may be relevant to the case, identifying the location of that digital data within the computing device, and understanding how to parse and interpret the digital data.

Prior art techniques for performing digital forensics include extracting files from the computing device and manually reviewing the digital data. These techniques are slow, labor-intensive, inconsistent, error-prone, and require specialized technical knowledge. These techniques also have no ability to scale, and investigators can be quickly overwhelmed if multiple mobile devices need to be analyzed quickly.

What is needed is a digital forensics tool for quickly extracting digital data from one or more computing devices, transforming and analyzing the digital data, and identifying important evidence within the digital data and presenting that digital data in an intuitive understandable format for investigators.

SUMMARY OF THE INVENTION

A digital forensics tool and associated method are disclosed for extracting digital data from a user computing device, transforming and analyzing the digital data, and generating an interactive user interface that facilitates the identification of important digital data, such as for a criminal investigation.

BRIEF DESCRIPTION OF THE DRAWINGS

FIG. 4A depicts functionality of an example screen of a user interface provided by the digital forensics tool of FIG. 1.

FIG. 6A depicts functionality of an example screen of a user interface provided by the digital forensics tool of FIG. 1.

FIG. 6B depicts an example screenshot of a user interface implementing some or all of the functionality of FIG. 6A.

FIG. 8A depicts functionality of an example screen of a user interface provided by the digital forensics tool of FIG. 1.

DETAILED DESCRIPTION OF THE INVENTION

Figure 1:
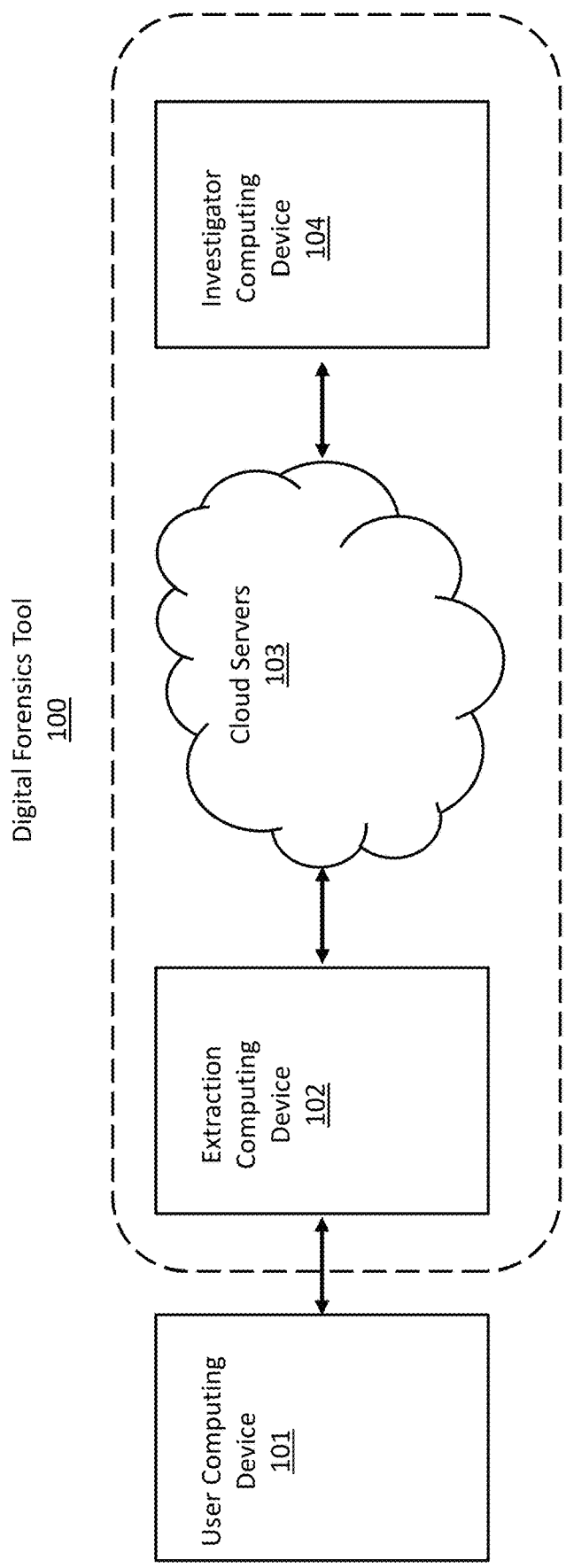
FIG. 1 depicts a digital forensics tool.

FIG. 1 depicts digital forensics tool 100. Digital forensics tool 100 is connected to user computing device 101. User computing device 101 is the device containing the digital data to be extracted and analyzed. For example, user computing device 101 might be a mobile device (such as a mobile phone running an operating system known by the trademarks "IOS" or "ANDROID").

Digital forensics tool 100 comprises extraction computing device 102, cloud servers 103, and investigator computing device 104. User computing device 101, extraction computing device 102, cloud servers 103, and investigator computing device 104 each is a computing device comprising one or more processing units, memory, non-volatile storage, and a network interface. The one or more processing units are able to execute software code.

Extraction computing device 102 is in physical proximity to user computing device 101. Extraction computing device 102 connects to user computing device 101 over a wired connection (such as a USB connection) or wireless connection (such an 802.11 connection). Extraction computing device 102 also connects to cloud servers 103 over a network via a wired or wireless connection. The network can be a private network (such as a Local Area Network) or a public network (such as the Internet). Alternatively, extraction computing device 102 instead can comprise software that is installed on user computing device 101 to perform the extraction and to communication with cloud servers 103. This software can be referred to as an "agent."

Cloud servers 103 comprises one or more computing devices.

Investigator computing device 104 is a computing device operated by an investigator. Investigator computing device 104 connects to cloud 103 over a network via a wired or wireless connection. As used herein, the term "user" refers to a person who operates or owns user computing device 101, and the term "investigator" refers to a person who is interested in the digital data stored in the user computing device 101. An "investigator" can be a law enforcement official but also can be any other person interested in the digital data.

Figure 2:
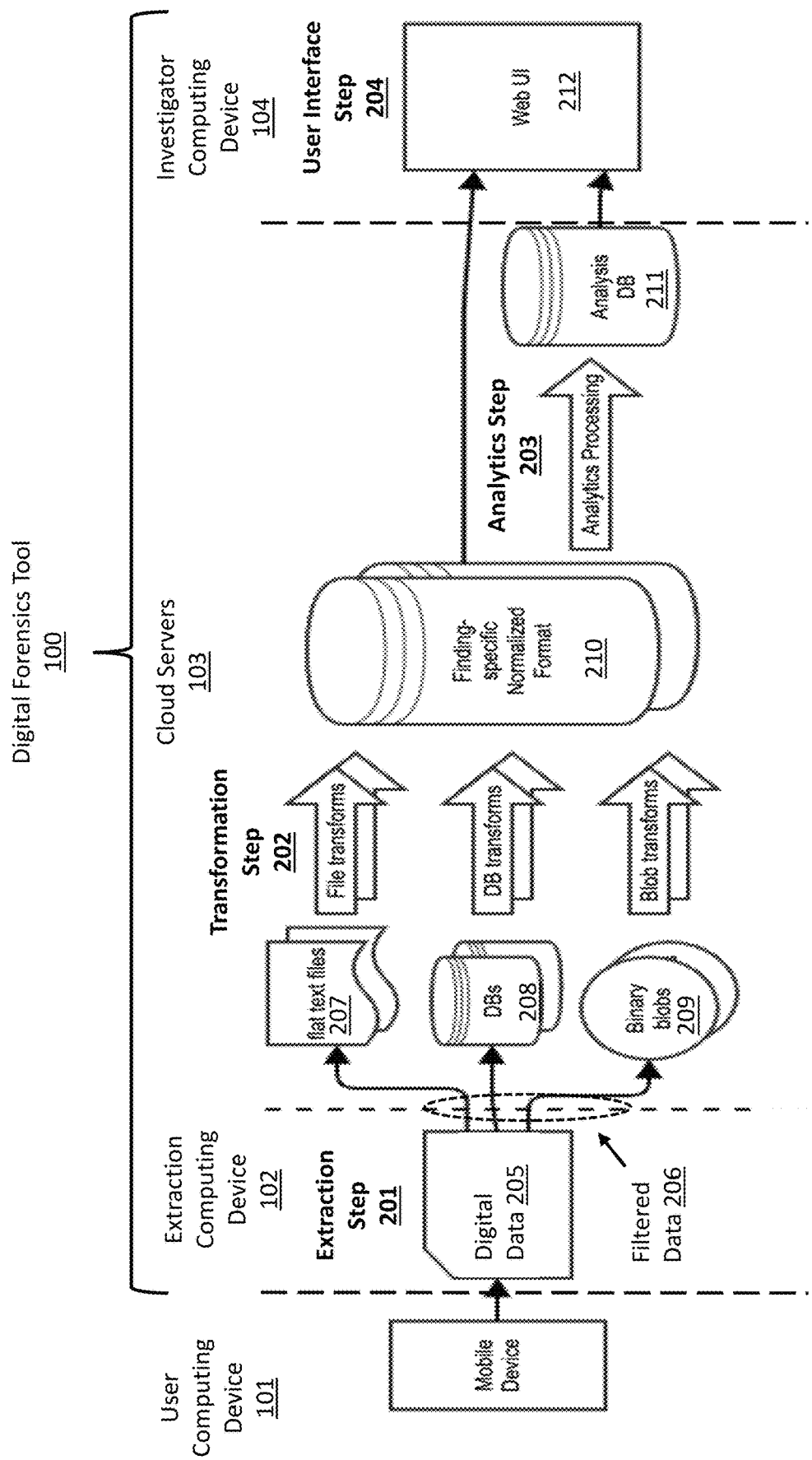
FIG. 2 depicts a digital forensics method that utilizes the digital forensics tool of FIG. 1.

FIG. 2 depicts digital forensic method 200 performed by digital forensic tool.

In extraction step 201, extraction computing device 102 extracts digital data 205 from user computing device 101, which comprises all data in user computing device 101. An investigator optionally can instruct extraction computing device 102 to ignore certain data (such as verified system files), or optionally to include only certain data (such as photos and text messages) and to generate filtered data 206 that contains only the data of interest. For example, many of the potentially millions of files on user computing device 101 typically will be system files that are unchanged by the user and will be irrelevant to an investigation. Extraction computing device 102 optionally can collect metadata for each file, such as checksum, file name, file size, and the name and version of the operating system. If the metadata for a particular file matches the metadata for a known system file (e.g., a known operating system), then extraction computing device 102 can ignore that file and not include it in filtered data 206. Optionally, investigator computing device 104 can provide an investigator with an interface to set the parameters of the filter by indicating which types of data are to be excluded or included. Extraction computing device 102 sends filtered data 206 to cloud servers 103.

In transformation step 202, cloud servers 103 receive filtered data 206, and parse filtered data 206 into flat text files 207, databases 208, and other binary data 209. Other binary data 209 can include all digital that is not a flat text file 207 or a database 208. Cloud servers 103 then parse flat text files 207, databases 208, and other binary data 209 into normalized data 210 (which is data of a specific normative format). Examples of data types that can be collected as flat text files 207, databases 208, and other binary data 209 during transformation step 202 include communication, media, location, calendar, web searches, purchases, payments, notes, and files. Alternatively, transformation step 202 can instead be performed by extraction computing device 102, or by both extraction computing device 102 and cloud servers 103.

In analytics step 203, cloud servers 103 analyze normalized data 210 and populates analysis database 211 with results from that analysis, which can include digital data that is potentially of interest to an investigator.

In user interface step 204, investigator computing device 104 generates a user interface, such as web user interface 212, for an investigator to interact with, using data received from cloud servers 103 including from analysis database 211. Investigator computing device 104 provides interfaces for an investigator to instruct cloud servers 103 and investigator computing device 104 as to which data is of interest to the investigation.

Figure 3:
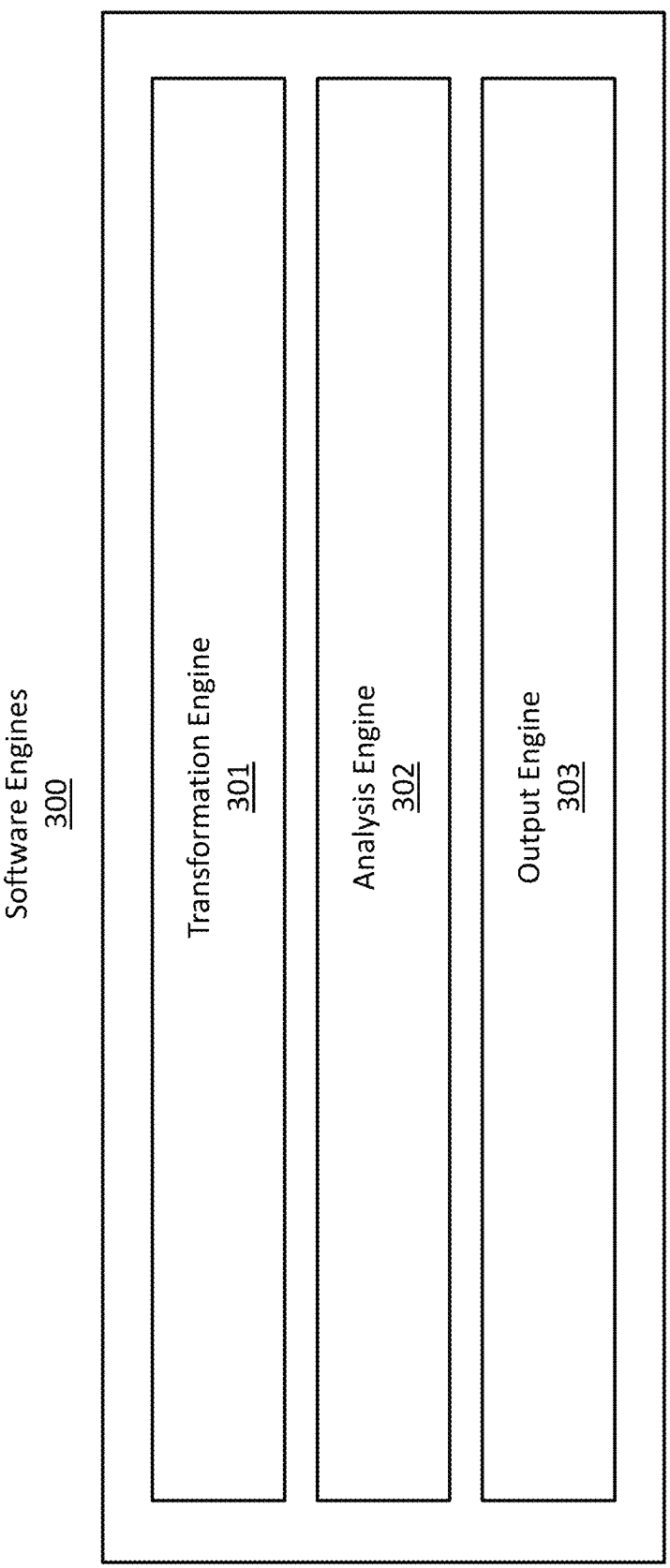
FIG. 3 depicts software engines operated by the digital forensics tool of FIG. 1.

FIG. 3 depicts software engines 300 operated by cloud servers 103 (or by a combination of extraction computing device 102 and cloud servers 103) to perform digital forensics method 200 of FIG. 2. Software engines 300 comprise transformation engine 301 to perform transformation step 202 of FIG. 2, analysis engine 302 to perform analytics step 203 of FIG. 2, and output engine 303 to perform user interface step 204 of FIG. 2. Transformation engine 301, analysis engine 302, and output engine 303 each comprises lines of software code executed by one or more processing units of cloud servers 103.

It is important for a criminal investigation that the end results of digital forensics method 200 be traceable back to the source data contained on user computing device 101. To facilitate this traceability, digital forensics tool 100 will cryptographically hash the source data and subsequent transformations of the data to facilitate reproduction of the steps and validate the integrity of the data at each step. The data transformations and queries themselves may also be hashed for complete end-to-end traceability.

Analytics step 203 of FIG. 2 (performed by analysis engine 302 of FIG. 3) optionally can identify digital data on one or more user computing devices 101 that meet certain criteria or share certain traits in common, such as the following:

Location;
Communication with individuals or groups including phone call logs, video calls, email, SMS/MMS, in-app messaging, etc.;
Scheduled meetings and calendar events;
Purchases or money transfers;
Digital media in various formats (e.g., social media, photos, videos, podcasts, etc.);
App usage (including document access) for encrypted communications apps, authentication apps, ride share apps, file sharing apps, etc.;
Web browsing and search history/behavior;
Connections to and usage statistics for networks or devices, such as cellular (4G/5G LTE), Wi-Fi, Bluetooth, VPN, AirDrop, wearables, and infotainment systems;
Device backups, device syncs, storage cleanup, data deletions;
Application install and uninstall states; and
Battery charging cycles.

Analytics step 203 of FIG. 2 (performed by analysis engine 302 of FIG. 3) optionally can identify anomalies in normalized data 210. This processing may include machine learning techniques to detect anomalous behaviors. Anomalies can be detected in the data extracted from a single user computing device 101 or from multiple user computing devices 101.

An example of an anomaly found within data from a single user computing device 101 includes deviations from established travel patterns. For example, if the owner of user computing device 101 normally travels a set route to arrive at his or her work location between 8:00 and 8:30, the system could flag an occurrence where the owner arrived at noon or traveled to an alternate location instead.

An example of an anomaly found within data from a multiple user computing devices 101 can include a pattern outlier for encrypted messaging apps among users of those apps, such as identifying a user as among the top 10% of all users of a particular encrypted communications app.

Analytics step 203 of FIG. 2 (performed by analysis engine 302 of FIG. 3) optionally can analyze contacts information to identify potential suspects or known associates of potential suspects. Individuals and devices can be identified by various identifiers including:

Name (first and/or last);
Nickname(s) (e.g., "Mom");
Phone number(s);
Email address(es);
Third-party app account ID(s); and
Device identifiers including ESN, IMEI, SIM, MSN.

Mapping these various identifiers to a single individual using prior art techniques can be a time consuming, tedious, and error prone task requiring the investigator to know where to find the various identifiers and then cross-reference various communications to associate these identifiers with each other. Analysis engine 302 will search within known locations of identifiers (e.g., in a file created by an app) and use various techniques to associate the identifiers and to match individuals across applications, such as:

Cross-correlation of data across applications;
Name matching using string similarity algorithms (Hamming, Levenshtein, Jaccard, Sorensen-Dice, Ratcliff-Obershelp, etc.);
Repeated forms of address; and
Common terminology and phrasings used in communications.

By storing extraction data 205 in the cloud, the system can facilitate searches across user computing devices 101 in ways that are not possible when only analyzing devices locally. For example, cloud servers 103 can establish a contact or artifact registry in analysis database 211 that allows investigators with appropriate permissions to search for a particular contact or artifact (by file hash) within the boundary of those permissions. This view across user computing devices 101 and collected over time and multiple investigations would facilitate the creation of a much wider network of organization members and their communications making it possible to identify leaders and associates of criminal organizations. This network could be used to trace the spread of particular files or photos through the network identifying the original source of the material. This function would also permit investigators to follow threads of evidence into historical evidence that had been previously extracted from the same device.

User interface step 204 of FIG. 2 (performed by output engine 303 of FIG. 3) and investigator computing device 104 optionally can implement a natural query language for an investigator to use to formulate searches. Context and queries may be entered into investigator computing device 104 using a keyboard, using voice commands, by uploading a written report that is then scanned via Optical Character Recognition (OCR), or any other input mechanism.

User interface step 204 of FIG. 2 (performed by output engine 303 of FIG. 3) and investigator computing device 104 also enable display and reporting functionality to quickly identify key evidence for the investigator. Prior art techniques typically limit display results to a listing of relevant search results from a specific set of source files including text or pictures. User interface step 204 provides results in intuitive graphical display on investigator computing device 104, including:
  Location data on interactive maps;
  Communications across platforms and applications in a sequential timeline; and
  Relationships between contacts and relative frequency of communications via network graphs.

Analysis engine 302 will automatically analyze media files and text records to provide notifications to investigators of potential evidence related to specific types of criminal activities. This analysis can include machine learning classification, comparing file hashes against a databases of known file hashes, and searching for common keywords of interest (e.g., names of known criminals).

FIGS. 4A, 5A, 6A, 7A, and 8A depict examples of functionality provided by a user interface such as web user interface 212. FIGS. 4B, 5B, 6B, 7B, and 8B depict screenshots of user interfaces from a prototype developed by Applicant and correspond to FIGS. 4A, 5A, 6A, 7A, and 8A, respectively.

Figure 4B:
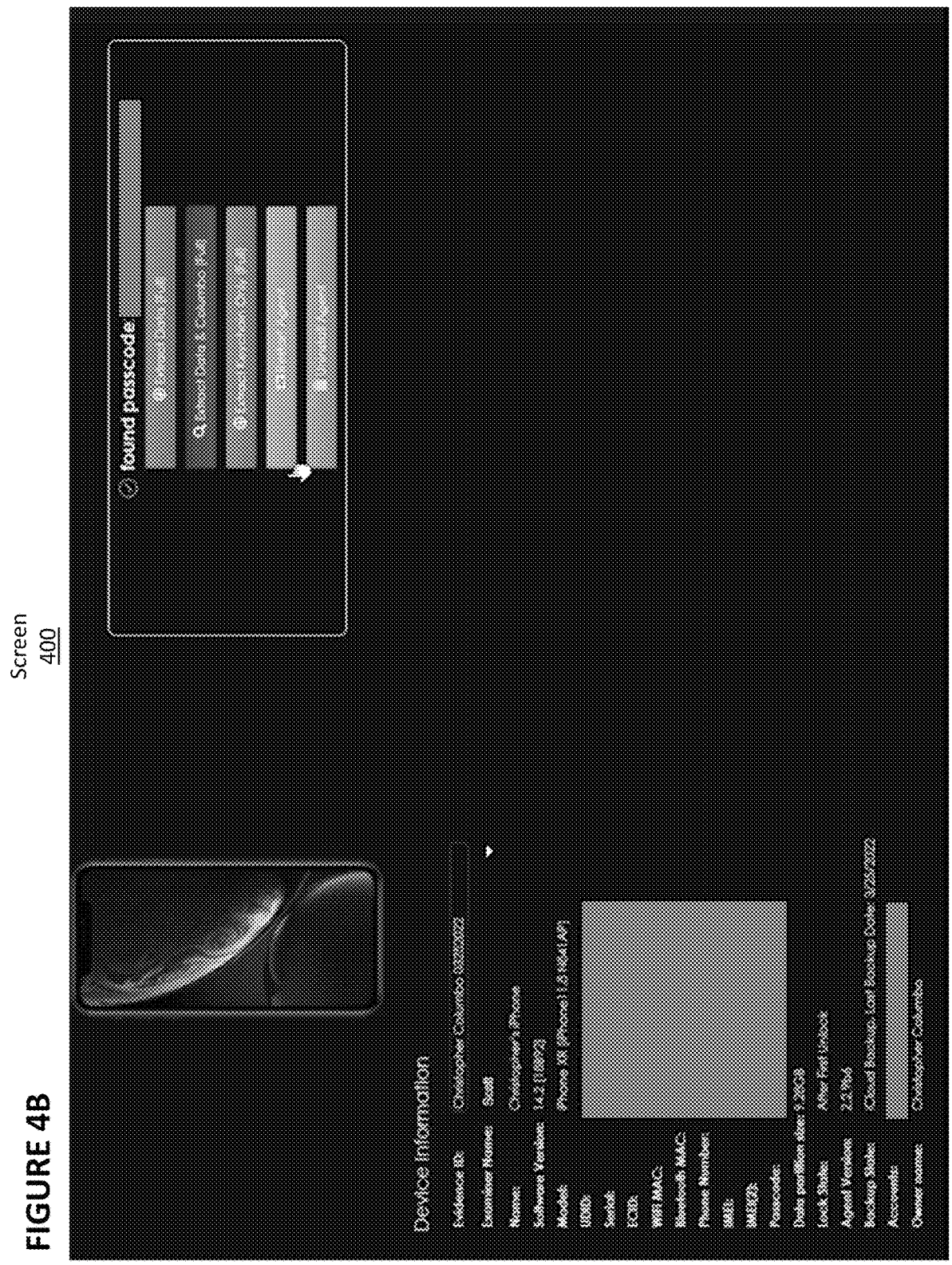
FIG. 4B depicts an example screenshot of a user interface implementing some or all of the functionality of FIG. 4A.

FIGS. 4A and 4B depict screen 400. Screen 400 displays device information 401 for user computing device 101, passcode status 402, and input interfaces 403. Device information 401 comprises information about user computing device 101 identified during analytics step 203 of FIG. 2, and can include:
  Evidence ID
  Examiner Name
  Device Name
  User Name
  OS Version
  Model
  UDID
  Serial Number
  ECID
  WiFi MAC
  Bluetooth MAC
  Phone Number
  IMEI
  Passcode
  Data Partition Size
  Lock State
  Agent Version
  Backup State
  Accounts Passcode status 402 indicates whether the passcode for user computing device 101 has been determined. Input interfaces 403 comprises buttons, links, text boxes, or other interfaces through which an investigator can provide instructions to cloud servers 103. In this example, interfaces 403, 404, 405, and 406 allow an investigator to instruct cloud servers 103 to obtain all data, obtain select data, restart agent, and uninstall agent, respectively.

Figure 5A:
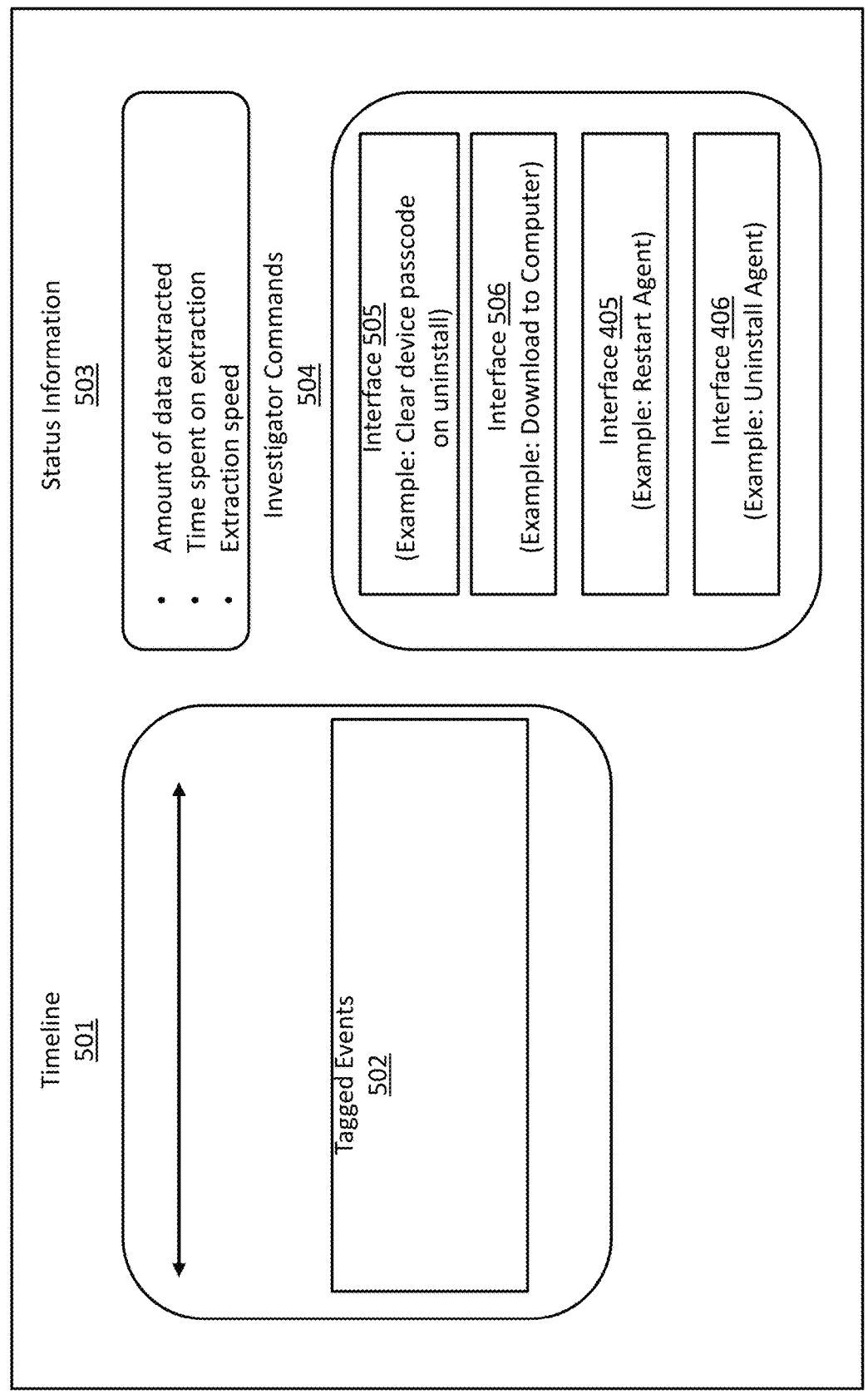
FIG. 5A depicts functionality of an example screen of a user interface provided by the digital forensics tool of FIG. 1.
Figure 5B:
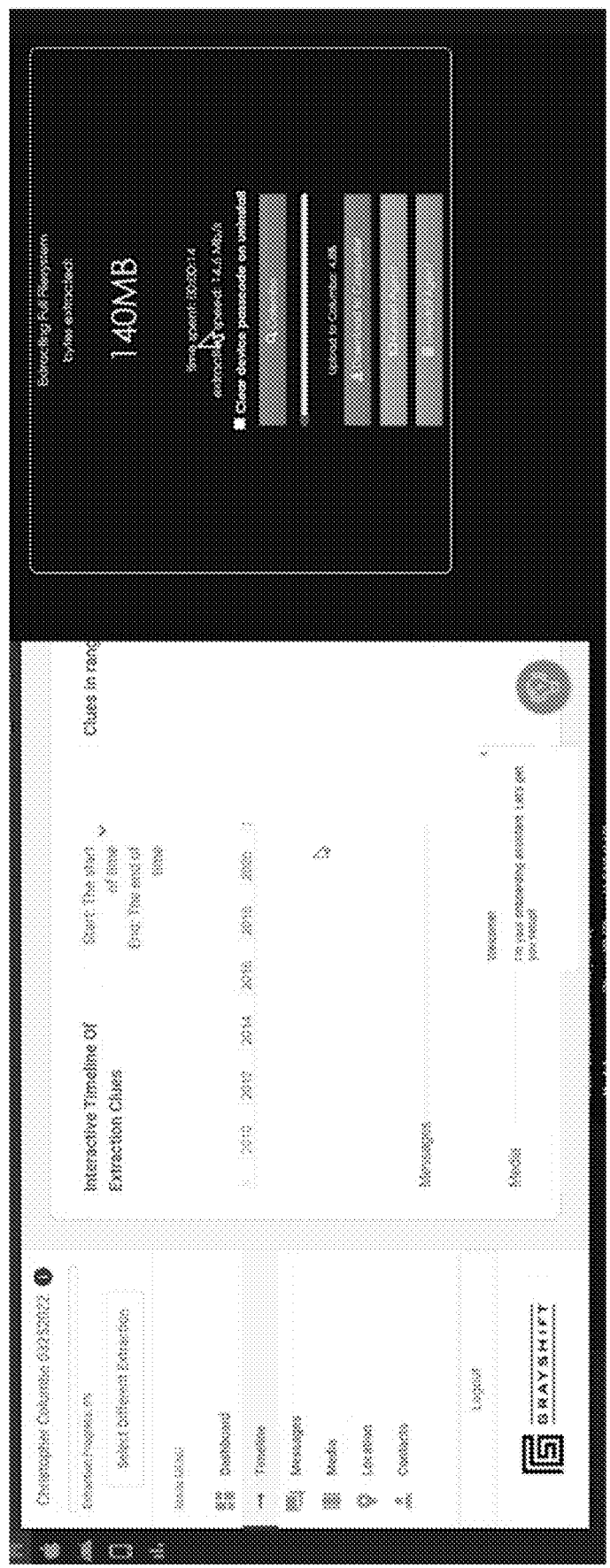
FIG. 5B depicts an example screenshot of a user interface implementing some or all of the functionality of FIG. 5A.

FIGS. 5A and 5B depict screen 500. Screen 500 displays timeline 501, tagged events 502, status information 503, and input interfaces 504. Timeline 501 can display a timeline of years, months, or days for the period of interest to the investigator, with key information corresponding to certain times. Tagged events 502 displays events on timeline 501 that the investigator has tagged as an item of interest (such as a text message between the owner of user computing device 101 and a known criminal). Status information 503 indicates the status of the extraction process and can include amount of data extracted, time spent on extraction, and extraction speed. Input interfaces 504 comprises buttons, links, text boxes, or other interfaces through which an investigator can provide instructions to cloud servers 103. In this example, interfaces 505, 506, 507, and 508 allow an investigator to instruct cloud servers 103 to clear device passcode on uninstall, download the extracted data to investigator computing device 104, restart agent, and uninstall agent, respectively.

Figure 6B:
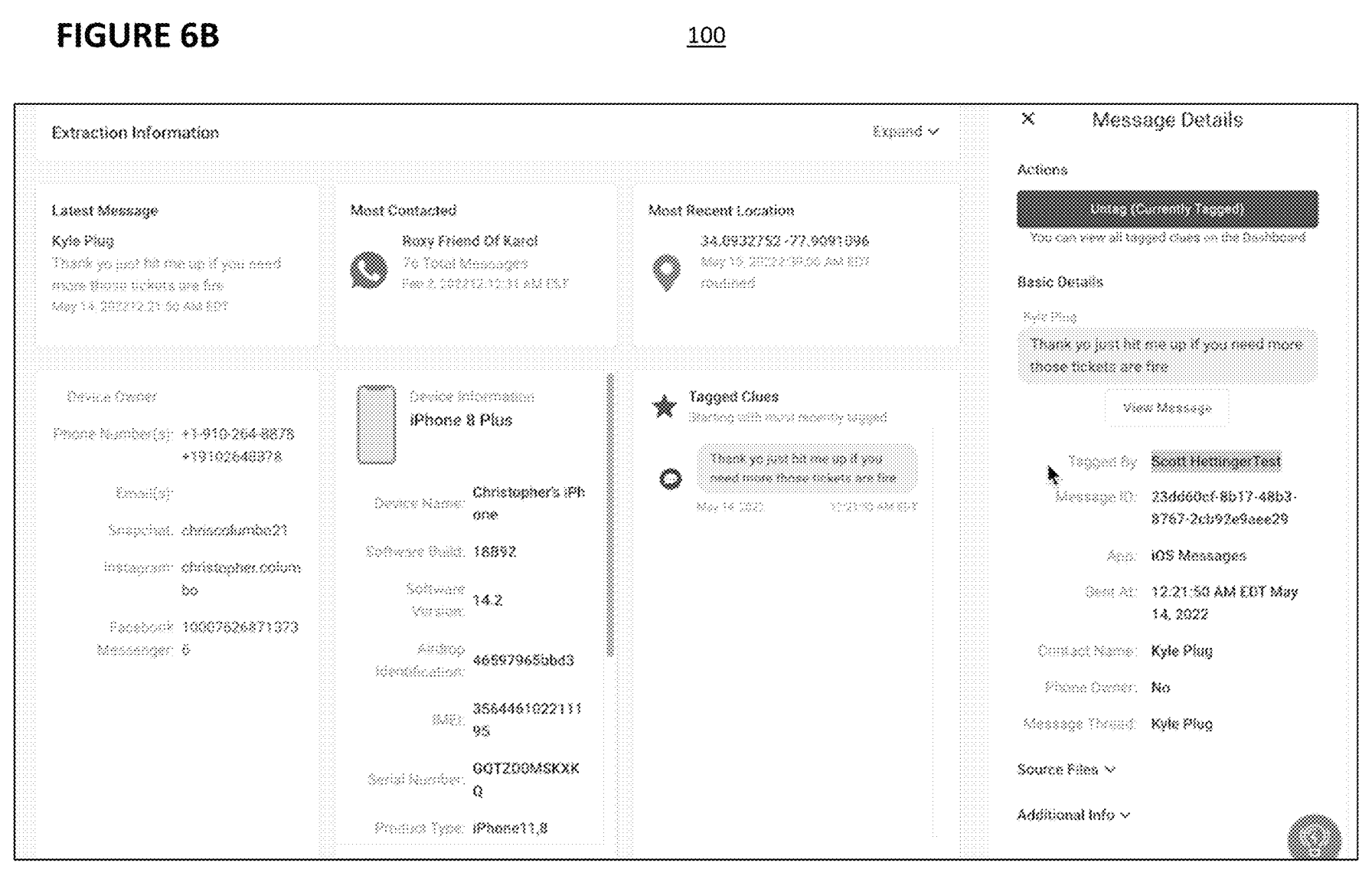

FIGS. 6A and 6B depict screen 600. Screen 600 displays latest message 601, most contacted 602, most recent location 603, message details 604, device owner 605, device information 606, and tagged clues 607. Latest message 601 is the most recent email or text message sent or received by user computing device 101. Most contacted 602 is the person who user computing device 101 has contacted most frequently via phone, email, text, or other measures. Most recent location 603 is the most recent physical location in which user computing device 101 was located. Message details 604 includes the full text of a text message chain that has been tagged by an investigator. Device owner 605 comprises information about the owner of user computing device 101 and can include:
  Phone Number
  Email
  Snapchat ID
  Instagram ID
  Facebook ID
  Messenger ID Device information 606 comprises information about user computing device 101 and can include:

Device Name
Software Build
Software Version
Airdrop ID
IMEI
Serial Number
Product Type Tagged clues 607 comprises clues that have been tagged by an investigator and can include:

Photo
Video
Text
Phone Call
Email
Social Media Post
Location

Figure 7A:
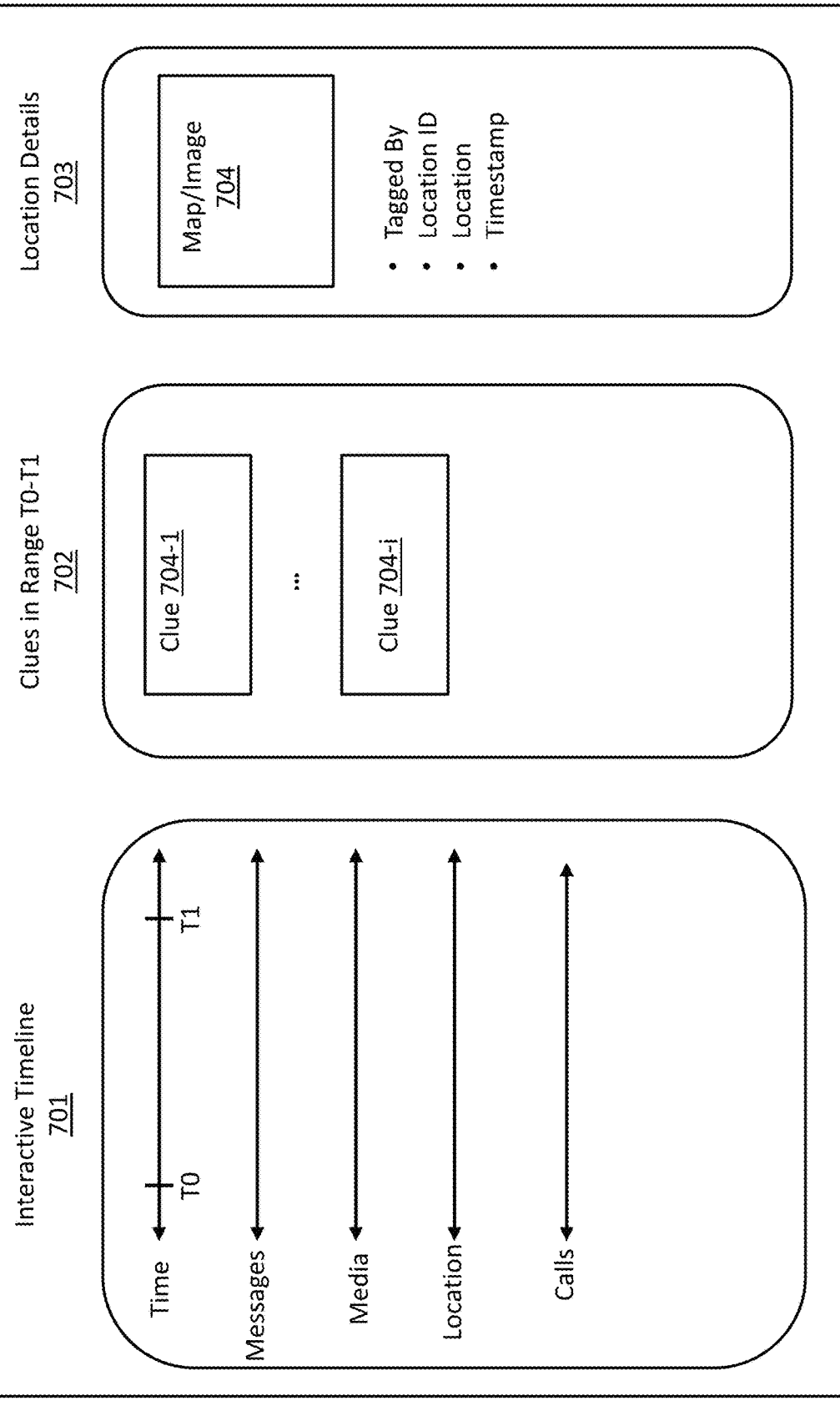
FIG. 7A depicts functionality of an example screen of a user interface provided by the digital forensics tool of FIG. 1.
Figure 7B:
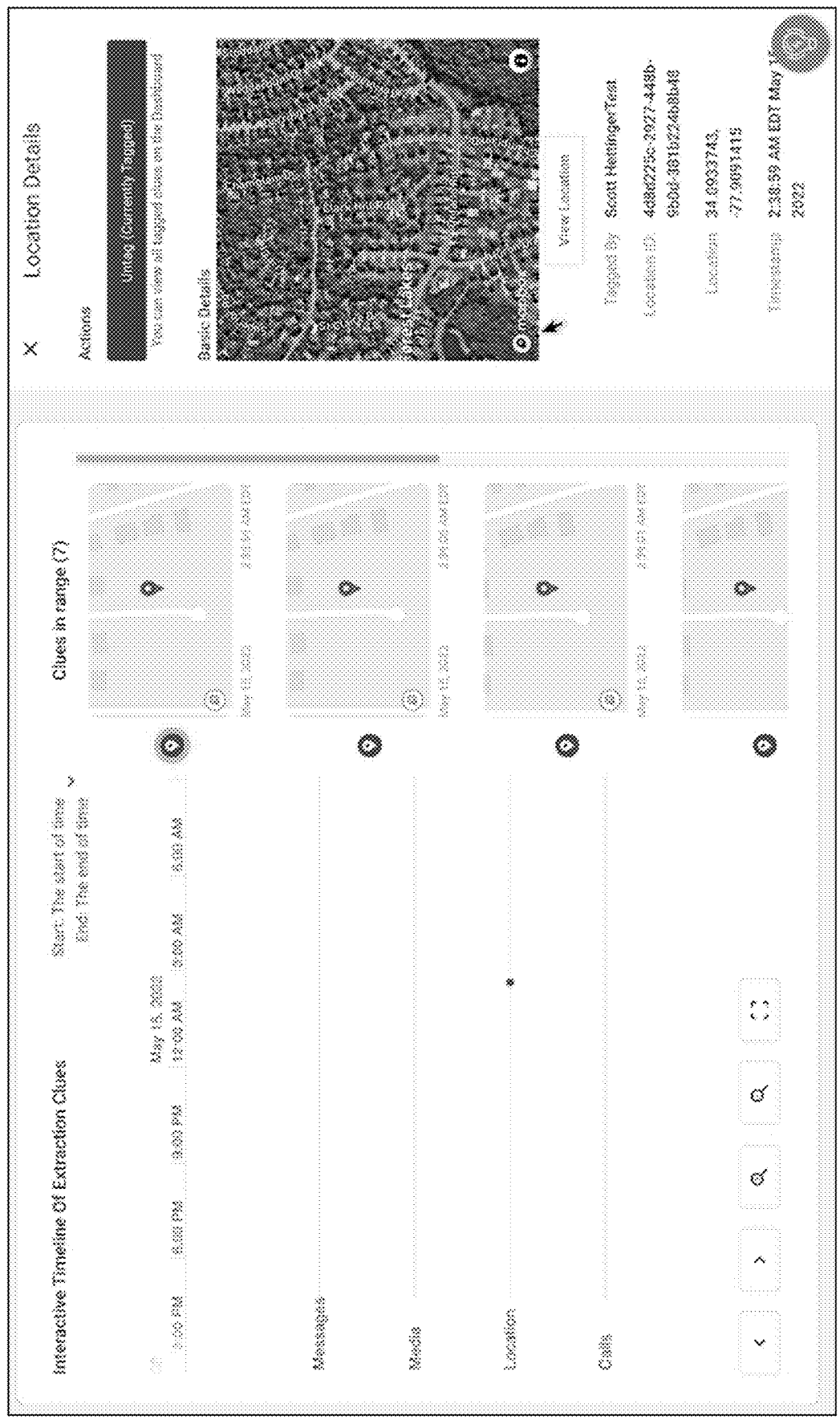
FIG. 7B depicts an example screenshot of a user interface implementing some or all of the functionality of FIG. 7A.

FIGS. 7A and 7B depict screen 700. Screen 700 comprises interactive timeline 701, clues in time range T0 to T1 702, and location details 703. Interactive timeline 701 comprises a timeline, here showing a period T0 to T1, which is a period of interest to the investigator, and associated timelines showing messages, media, location, and calls during that time period. Clues 702 comprises clues 704-1, . . . , 704-i, which are i clues that have been tagged by the investigator or otherwise identified by digital forensics tool 100 as important to the investigation. Location details 703 includes location information for a location of interest and includes map/image 704 and information such as name of the investigator who tagged this location, location ID, location, and timestamp.

Figure 8B:
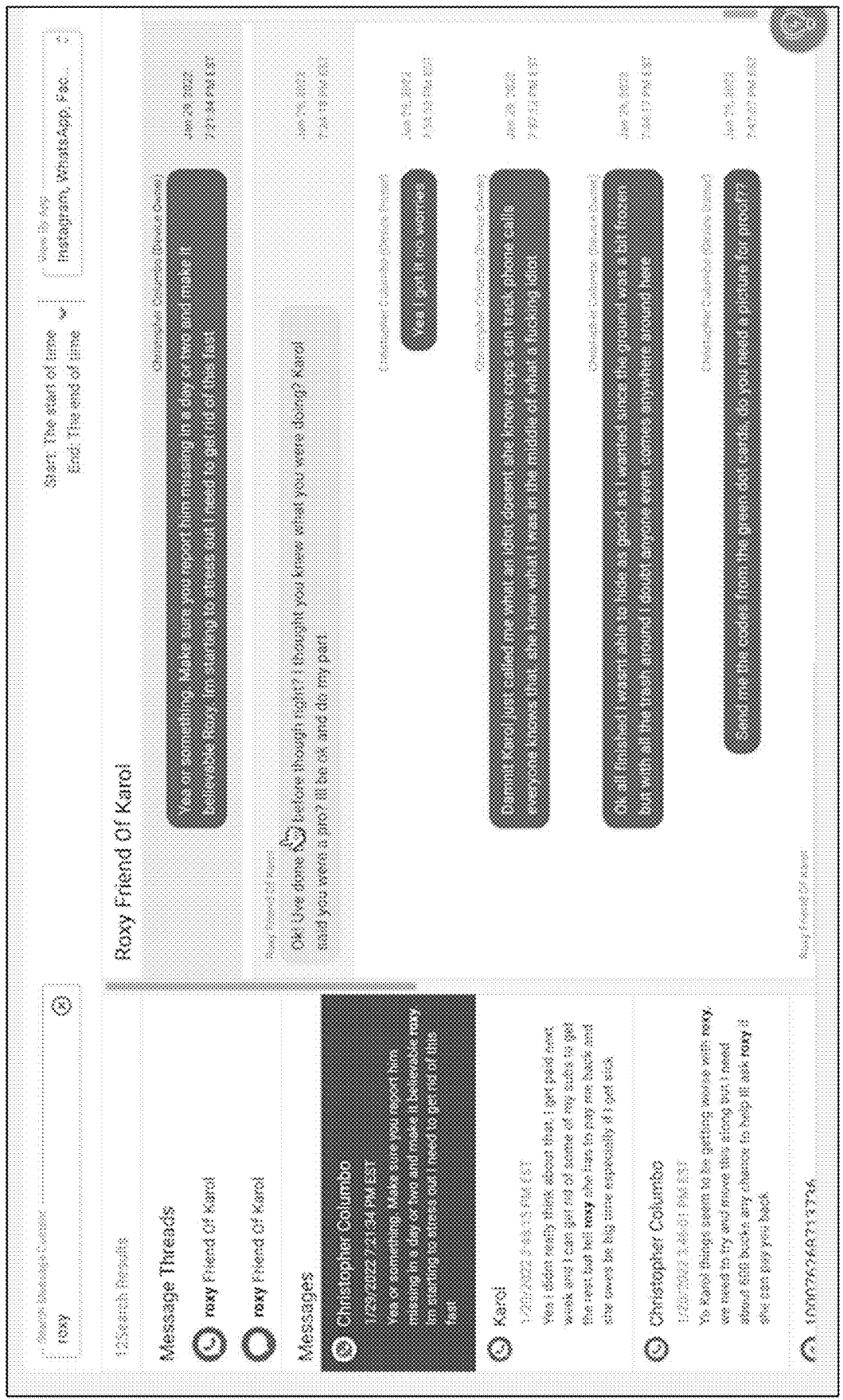
FIG. 8B depicts an example screenshot of a user interface implementing some or all of the functionality of FIG. 8A.

FIGS. 8A and 8B depict screen 800. Screen 800 comprises message threads 801 and messages in selected message thread 802. This display allows the investigator to see messages across multiple apps (e.g., Instagram, WhatsApp, Facebook Messenger, etc.) in a single view.

It should be noted that, as used herein, the terms "over" and "on" both inclusively include "directly on" (no intermediate materials, elements or space disposed therebetween) and "indirectly on" (intermediate materials, elements or space disposed therebetween). Likewise, the term "adjacent" includes "directly adjacent" (no intermediate materials, elements or space disposed therebetween) and "indirectly adjacent" (intermediate materials, elements or space disposed there between), "mounted to" includes "directly mounted to" (no intermediate materials, elements or space disposed there between) and "indirectly mounted to" (intermediate materials, elements or spaced disposed there between), and "electrically coupled" includes "directly electrically coupled to" (no intermediate materials or elements there between that electrically connect the elements together) and "indirectly electrically coupled to" (intermediate materials or elements there between that electrically connect the elements together). For example, forming an element "over a substrate" can include forming the element directly on the substrate with no intermediate materials/elements therebetween, as well as forming the element indirectly on the substrate with one or more intermediate materials/elements there between.

What is claimed is:

1. A digital forensics method comprising:
   coupling one or more extraction computing devices to one or more mobile devices;
   extracting, by the one or more extraction computing devices, a first set of digital data from the one or more mobile devices;
   filtering, by the one or more extraction computing devices, the first set of digital data into a second set of digital data comprising one or more flat text files and not including certain types of data in the first set of digital data;
   receiving, by a cloud server from the one or more extraction computing devices, the second set of digital data;
   transforming, by the cloud server, the second set of digital data into a third set of digital data of a normalized format;
   analyzing, by the cloud server, the third set of digital data to generate results; and
   generating a user interface, on a user computing device, to display one or more of an interactive map derived from location data in the results, a timeline of communications to or from the one or more mobile devices contained in the results, and a network graph indicating relationships between contacts in the results and frequency of communications with contacts in the results.

2. The method of claim 1, wherein the extracting is performed by one or more extraction computing devices connected to the one or more mobile devices.

3. The method of claim 1, wherein the extracting is performed by a software agent installed on the one or more mobile devices.

4. The method of claim 1, wherein the filtering prioritizes a type of data in the first set of digital data in response to a command entered by a user.

5. The method of claim 1, wherein the transforming step comprises:
   automatically parsing data in the second set of data from files and databases associated with one or more applications into the normalized format independent of source.

6. The method of claim 1, further comprising:
   recording the location of the first set of digital data within the one or more mobile devices during the filtering step and recording all transformations of data during the transforming step.

7. The method of claim 1, further comprising:
   providing access to the results and some or all of the second set of digital data to one or more additional user computing devices.

8. The method of claim 1, further comprising:
   storing contact information identified in the third set of digital data into a database.

9. The method of claim 8, further comprising:
   cross-referencing data in the database with contact information obtained from one or more other mobile devices.

10. The method of claim 1, further comprising:
    generating an alert when the third set of digital data contains contact information previously flagged by a user computing device.

11. The method of claim 1, wherein the user interface comprises an interactive interface allowing actions comprising changing time scales, filtering content by source, zooming in and out of maps, and scrolling through sequential photos.

12. The method of claim 1, wherein the analyzing comprises identifying an individual using a plurality of forms of identification.

13. The method of claim 12, wherein the plurality of forms of identification comprise two or more of first name, last name, nickname, phone number, email address, username, account ID, and device identifier.

14. The method of claim 1, wherein the results comprise one or more pattern of life anomalies.

15. The method of claim 14, wherein the one or more pattern of life anomalies comprise variations in typical locations, timing patterns, communications, and behaviors.

16. The method of claim 1, wherein the generating further comprises displaying a timeline and displaying some or all of the results on the timeline.

17. The method of claim 1, wherein the generating further comprises displaying a map showing a location of the one or more mobile devices using data from a plurality of sources.

18. The method of claim 1, wherein the generating further comprises displaying media from a plurality of sources.

19. The method of claim 1, wherein the generating further comprises displaying communications from a plurality of sources.

20. The method of claim 1, wherein the results comprise one or more of device name, operating system version, model, serial number, and passcode.

21. A digital forensics tool comprising:
one or more computing devices storing instructions to perform the following steps when executed:
extracting a first set of digital data from one or more mobile devices;
filtering the first set of digital data into a second set of digital data comprising one or more flat text files and not including certain types of data in the first set of digital data;
transforming the second set of digital data into a third set of digital data of a normalized format;
analyzing the third set of digital data to generate results; and
generating a user interface to display one or more of an interactive map derived from location data in the results, a timeline of communications to or from the one or more mobile devices contained in the results, and a network graph indicating relationships between contacts in the results and frequency of communications with contacts in the results.

22. The digital forensics tool of claim 21, wherein the extracting is performed by one or more extraction computing devices connected to the one or more mobile devices.

23. The digital forensics tool of claim 21, wherein the extracting is performed by a software agent installed on the one or more mobile devices.

24. The digital forensics tool of claim 21, wherein the filtering prioritizes a type of data in the first set of digital data in response to a command entered by a user.

25. The digital forensics tool of claim 21, wherein the transforming step comprises:
automatically parsing data in the second set of data from files and databases associated with one or more applications into the normalized format independent of source.

26. The digital forensics tool of claim 21, wherein the one or more computing devices store instructions to perform the following step:
recording the location of the first set of digital data within the one or more mobile devices during the filtering step and recording all transformations of data during the transforming step.

27. The digital forensics tool of claim 21, wherein the one or more computing devices store instructions to perform the following step:
providing access to the results and some or all of the second set of digital data to one or more additional user computing devices.

28. The digital forensics tool of claim 21, wherein the one or more computing devices store instructions to perform the following step:
storing contact information identified in the third set of digital data into a database.

29. The digital forensics tool of claim 28, wherein the one or more computing devices store instructions to perform the following step:
cross-referencing data in the database with contact information obtained from one or more other mobile devices.

30. The digital forensics tool of claim 21, wherein the one or more computing devices store instructions to perform the following step:
generating an alert when the third set of digital data contains contact information previously flagged by a user computing device.

31. The digital forensics tool of claim 21, wherein the user interface comprises an interactive interface allowing actions comprising changing time scales, filtering content by source, zooming in and out of maps, and scrolling through sequential photos.

32. The digital forensics tool of claim 21, wherein the analyzing comprises identifying an individual using a plurality of forms of identification.

33. The digital forensics tool of claim 32, wherein the plurality of forms of identification comprise two or more of first name, last name, nickname, phone number, email address, username, account ID, and device identifier.

34. The digital forensics tool of claim 21, wherein the results comprise one or more pattern of life anomalies.

35. The digital forensics tool of claim 34, wherein the one or more pattern of life anomalies comprise variations in typical locations, timing patterns, communications, and behaviors.

36. The digital forensics tool of claim 21, wherein the generating further comprises displaying a timeline and displaying some or all of the results on the timeline.

37. The digital forensics tool of claim 21, wherein the generating further comprises displaying a map showing a location of the one or more mobile devices using data from a plurality of sources.

38. The digital forensics tool of claim 21, wherein the generating further comprises displaying media from a plurality of sources.

39. The digital forensics tool of claim 21, wherein the generating further comprises displaying communications from a plurality of sources.

40. The digital forensics tool of claim 21, wherein the results comprise one or more of device name, operating system version, model, serial number, and passcode.

* * * * *